United States Patent
Martinet et al.

(10) Patent No.: US 12,224,438 B2
(45) Date of Patent: Feb. 11, 2025

(54) SPECIFIC ELECTROCHEMICAL CELL FOR ACCUMULATOR OPERATING ACCORDING TO THE PRINCIPLE OF FORMING AN ALLOY WITH THE ACTIVE MATERIAL OF THE NEGATIVE ELECTRODE COMPRISING A SPECIFIC PAIR OF ELECTRODES

(71) Applicant: COMMISSARIAT À L'ÉNERGIE ATOMIQUE ET AUX ÉNERGIES ALTERNATIVES, Paris (FR)

(72) Inventors: Sébastien Martinet, Grenoble (FR); Carole Bourbon, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 405 days.

(21) Appl. No.: 17/140,467

(22) Filed: Jan. 4, 2021

(65) Prior Publication Data

US 2021/0210781 A1    Jul. 8, 2021

(30) Foreign Application Priority Data

Jan. 7, 2020  (FR) ...................... 2000086

(51) Int. Cl.
| | |
|---|---|
| *H01M 4/58* | (2010.01) |
| *H01M 4/133* | (2010.01) |
| *H01M 4/134* | (2010.01) |
| *H01M 4/136* | (2010.01) |
| *H01M 4/587* | (2010.01) |
| *H01M 10/052* | (2010.01) |
| *H01M 10/054* | (2010.01) |
| *H01M 10/0567* | (2010.01) |
| *H01M 10/0568* | (2010.01) |
| *H01M 10/0569* | (2010.01) |

(52) U.S. Cl.
CPC ........... *H01M 4/582* (2013.01); *H01M 4/133* (2013.01); *H01M 4/134* (2013.01); *H01M 4/136* (2013.01); *H01M 4/587* (2013.01); *H01M 10/052* (2013.01); *H01M 10/054* (2013.01); *H01M 10/0567* (2013.01); *H01M 10/0568* (2013.01); *H01M 10/0569* (2013.01); *H01M 2300/0025* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 2014/0170493 A1* | 6/2014 | Holme | H01M 4/582 429/231.95 |
| 2014/0349180 A1 | 11/2014 | Kim et al. | |
| 2015/0236382 A1* | 8/2015 | Wietelmann | H01M 10/052 429/188 |
| 2017/0033359 A1* | 2/2017 | Ogumi | H01M 10/052 |
| 2019/0296308 A1* | 9/2019 | Antonopoulos | H01M 10/052 |

OTHER PUBLICATIONS

Cabana, Jordi et al: "Beyond Intercalation-Base Li-Ion Batteries: The State of the Art and Challenges of Electrode Materials Reacting Through Conversion Reactions" IN: Advanced Energy Materials, Sep. 15, 2020, vol. 22, No. 35, pp. E170-E192.
Search Report for French application No. FR 2000086 dated Sep. 1, 2020.

* cited by examiner

*Primary Examiner* — Laura Weiner
(74) *Attorney, Agent, or Firm* — Chrisman Gallo Tochtrop LLC

(57) ABSTRACT

An electrochemical cell for an accumulator operating according to the principle of forming an alloy with the active material of the negative electrode during the charge process comprising: a negative electrode comprising, as active material, a material alloyable with an element M, M being a metal element; a positive electrode comprising, as active material, a conversion material; an electrolyte comprising at least one salt of M disposed between the negative electrode and the positive electrode.

13 Claims, 1 Drawing Sheet

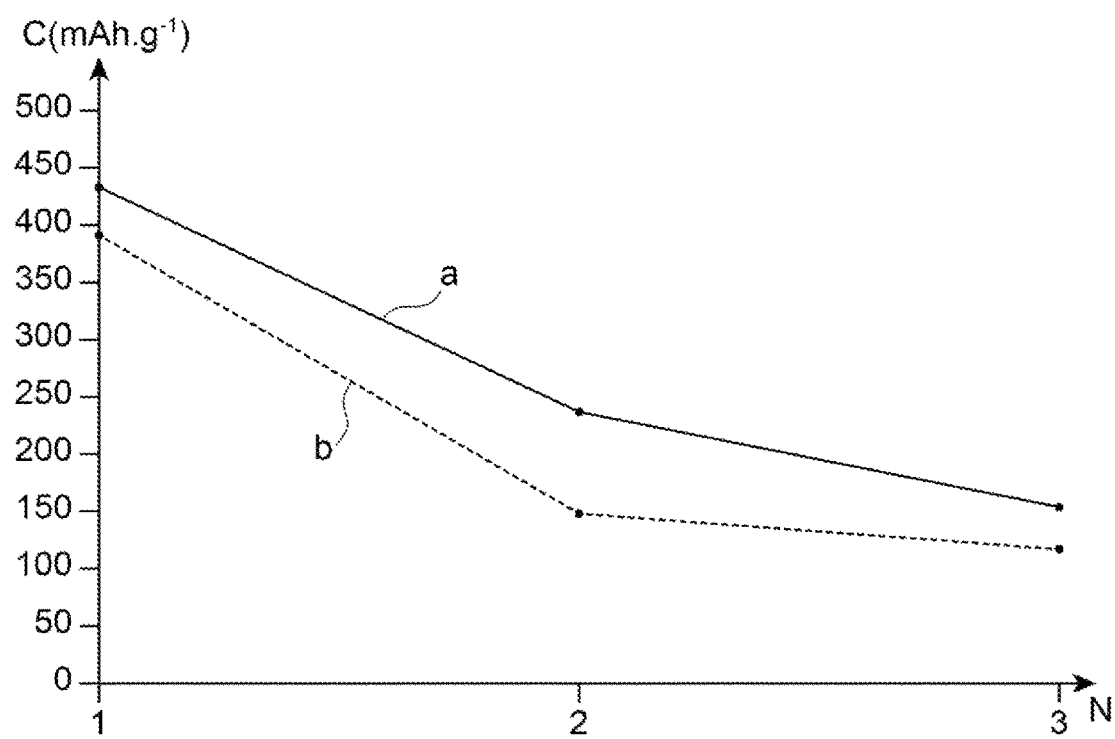

SPECIFIC ELECTROCHEMICAL CELL FOR ACCUMULATOR OPERATING ACCORDING TO THE PRINCIPLE OF FORMING AN ALLOY WITH THE ACTIVE MATERIAL OF THE NEGATIVE ELECTRODE COMPRISING A SPECIFIC PAIR OF ELECTRODES

CROSS-REFERENCE TO RELATED APPLICATIONS

This application claims priority from French Patent Application No. 2000086 filed on Jan. 7, 2020. The content of this application is incorporated herein by reference in its entirety.

TECHNICAL FIELD

The present invention relates to an electrochemical cell for an accumulator comprising a negative electrode comprising, as active material, a material alloyable with an element M, M can be an alkaline element (in particular, lithium) or an alkaline-earth element present in the electrolyte, the volume variations of this electrode occurring, during the charge and discharge cycles, by formation of an alloy or de-alloy, being compensated by the choice of a positive electrode including an active material capable of compensating for said volume variations.

The general field of the invention can thus be defined as being that of accumulators operating according to the principle of forming an alloy with at least one of the active electrode materials during the charge process.

Accumulators of this type, variants of metal-ion accumulators, are intended to be used as an autonomous energy source, in particular, in portable electronic equipment (such as mobile phones, laptops, tools), in order to gradually replace nickel-cadmium (NiCd) and nickel-metal hydride (NiMH) accumulators. They can also be used to provide power supply necessary for new micro-applications, such as integrated circuit cards, sensors or other electromechanical systems, as well as for electromobility.

From the point of view of operation, the aforementioned accumulators operate, during the charge process, according to the principle of forming an alloy with the active material of the negative electrode.

More specifically, taking lithium batteries for example, when charging the accumulator, the negative electrode will incorporate lithium from the ionic conductive electrolyte to form an alloy with the active material of the negative electrode, which can be silicon, tin, antimony, aluminium or germanium, the obtained practical specific capacities of the electrodes comprising such an active material being greater than those obtained with conventional negative electrodes based on graphite.

In particular, when silicon is used as active material, this allows to significantly increase the practical specific capacity of the negative electrode related to the insertion of lithium therein, which is 320 mAh/g for a graphite electrode (372 mAh/g in theory) and of the order of 3580 mAh/g for a silicon-based electrode (corresponding to the formation of the $Li_{15}Si_4$ alloy when inserting lithium into the silicon at room temperature). Thus, by means of simple forecasts, it is possible to consider a gain of approximately 40 and 35%, respectively in volume energy and in specific energy, if graphite is replaced by silicon in a conventional lithium accumulator. Moreover, the operating potential window of the lithium-silicon alloy of formula $Li_{15}Si_4$ (0.4-0.05 V/Li—$Li^+$) higher than that of graphite, allows to avoid the formation of a lithium metal deposit and the associated risks, while allowing the possibility of carrying out faster charges. In addition, it is established that the lithium-silicon alloy formation reaction, leading to a very high practical specific capacity (of the order of 3578 mAh/g), is reversible.

Nevertheless, the use of an alloyable material as the active material in a negative electrode of an accumulator raises a number of disadvantages.

In particular, with reference to a lithium accumulator comprising silicon as the active material of the negative electrode, during the reaction for the formation of the silicon-lithium alloy (corresponding to the insertion of lithium into the negative electrode in charge process), the volume expansion between the delithiated phase and the lithiated phase can reach 280%. This strong expansion, followed by a contraction of the same amplitude (corresponding to the de-insertion of lithium in the negative electrode during the discharge process) quickly leads to irreversible mechanical damage to the electrode and ultimately a loss of contact of the negative electrode with the underlying current collector. This can lead to a rapid loss of cycling capacity. To limit these phenomena, the use of silicon as the active material of the negative electrode can be used as a mixture in the negative electrode so that the latter does not exceed 10% by mass of the total mass of the negative electrode, which contributes to reducing the performance of the accumulator.

In view of the foregoing, the inventors have set themselves the purpose of providing electrochemical cells which provide the advantages related to the use of an active material for an alloyable negative electrode while eliminating the disadvantages related to the volume expansion mentioned above.

DESCRIPTION OF THE INVENTION

Also, the inventors have discovered, surprisingly, that by associating a positive electrode comprising a specific active material with the negative electrode including, as active material, an alloyable material, it is possible to compensate for the volume variation phenomena observed at the negative electrode during the charge process and the discharge process.

The invention thus relates to an electrochemical cell for accumulator operating according to the principle of forming an alloy with the active material of the negative electrode during the charge process comprising:
  a negative electrode comprising, as active material, an active material comprising a material alloyable with an element M, M being a metal element;
  a positive electrode comprising, as active material, an active material comprising a conversion material;
  an electrolyte comprising at least one salt of M disposed between the negative electrode and the positive electrode.

Before going into more detail in the description of this invention, the following definitions are specified.

Positive electrode, means, in what precedes and what follows, the electrode which acts as a cathode, when the accumulator delivers current (that is to say when it is in discharge process) and which acts as an anode when the accumulator is in charge process.

Negative electrode, means, in what precedes and what follows, the electrode which acts as an anode, when the accumulator delivers current (that is to say when it is in discharge process) and which acts as a cathode, when the accumulator is in charge process.

In the electrochemical cells of the invention, the negative electrode comprises, as active material, an active material comprising a material alloyable with an element M, M being a metal element, which element M is comprised in the electrolyte in the form of at least one salt of M.

More specifically, the alloyable material is a material comprising one or more metal or metalloid elements with oxidation degree 0, said material forming, in a reversible manner, during the process of charging the electrochemical cell, an alloy with the element M comprised in the electrolyte, M being a cation of the salt of M of the electrolyte. It is understood that, during the discharge process, the active material returns to its unalloyed state thus releasing the element M again, the reaction forming the alloy being a reversible reaction.

The element M can be an alkaline element, such as:
lithium, in which case the electrochemical cell for an accumulator can be qualified as an electrochemical cell for a lithium accumulator, the alloyable material in this case comprising (or being constituted of), advantageously, lead with oxidation degree 0, tin with oxidation degree 0, silicon with oxidation degree 0, germanium with oxidation degree 0, antimony with oxidation degree 0, phosphorus with oxidation degree 0 or combinations thereof, preference being given to germanium with oxidation degree 0, antimony with oxidation degree 0 or phosphorus with oxidation degree 0;
sodium, in which case the electrochemical cell for an accumulator can be qualified as an electrochemical cell for a sodium accumulator, the alloyable material in this case comprising (or being constituted of), advantageously, lead with oxidation degree 0, tin with oxidation degree 0, silicon with oxidation degree 0, germanium with oxidation degree 0, antimony with oxidation degree 0, phosphorus with oxidation degree 0 or combinations thereof;
potassium, in which case the electrochemical cell for an accumulator can be qualified as an electrochemical cell for a potassium accumulator, the alloyable material in this case comprising (or being constituted of), advantageously, lead with oxidation degree 0, tin with oxidation degree 0, silicon with oxidation degree 0, germanium with oxidation degree 0, antimony with oxidation degree 0, phosphorus with oxidation degree 0 or combinations thereof.

The element M can also be an alkaline earth element, such as:
calcium, in which case the electrochemical cell for an accumulator can be qualified as an electrochemical cell for a calcium accumulator, the alloyable material in this case comprising (or being constituted of), advantageously, lead with oxidation degree 0, tin with oxidation degree 0, silicon with oxidation degree 0, germanium with oxidation degree 0, antimony with oxidation degree 0, phosphorus with oxidation degree 0 or combinations thereof;
magnesium, in which case the electrochemical cell for an accumulator can be qualified as an electrochemical cell for a magnesium accumulator, the alloyable material in this case comprising (or being constituted of), advantageously, lead with oxidation degree 0, tin with oxidation degree 0, silicon with oxidation degree 0, germanium with oxidation degree 0, antimony with oxidation degree 0, phosphorus with oxidation degree 0 or combinations thereof.

The active material may consist only of the alloyable material or may further comprise an active element capable of intercalating the element M during the charge process, this active element possibly being graphite.

According to a particular embodiment, in particular, when the active material comprises, as alloyable material, silicon, the active material can thus consist of a graphite-silicon composite and more specifically, a composite material consisting of an aggregate of graphite particles and silicon particles.

The negative electrode may consist only of the active material or may further comprise:
a polymer binder, such as polyvinylidene fluoride (known by the abbreviation PVDF), a mixture of carboxymethylcellulose (known by the abbreviation CMC) with a latex of the styrene-butadiene (known by the abbreviation SBR) type or with polyacrylic acid (known by the abbreviation PAA); and/or
one or more electrically conductive adjuvants, which may be carbon materials such as carbon black or carbon fibres obtained in the vapour phase (known by the abbreviation VGCF).

The negative electrode can also be associated with a metallic current collector, such as a copper current collector. This means, in other words, that it is in direct contact with this collector, to allow the flow of electric current to the outside the electrochemical cell. The current collector can be in the shape of a copper strip. The negative electrode, on the other hand, can be in the shape of a coated layer on the current collector.

The positive electrode, in turn, comprises, as active material, an active material comprising a conversion material, that is to say a material undergoing a conversion reaction during the discharge process, by electrochemical reduction by the element M present in the electrolyte, this reaction being materialised, conventionally, by a displacement of atoms of the material by the introduction of the element M, said atoms being extruded out of the network of the material in the oxidation state 0, while the element M forms a compound with the other atoms of the material, whereby this results in a composite material comprising particles of atoms in the oxidation state 0 from the conversion material, said particles being encapsulated in a matrix formed of the compound of element M with the other atoms of the conversion material.

For example, if it is considered that the conversion material meets the formula AX and the element M is lithium, the conversion reaction can be schematised by the following equation:

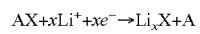

$$AX + xLi^+ + xe^- \rightarrow Li_xX + A$$

x corresponding to the oxidation degree of X.

More specifically, the conversion material may comprise (or be) a fluoride of at least one transition metal element, a phosphide of at least one transition metal element, a sulphide of at least one transition metal element, an oxide of at least one transition metal element and/or mixtures thereof. It is understood, in view of the above, that the conversion material is in the form of a fluoride of at least one transition metal element, of a phosphide of at least one transition metal element, of a sulphide of at least one transition metal element, of an oxide of at least one transition metal element or mixtures thereof, when the cell is in the charged state.

Advantageously, the conversion material comprises (or is) a fluoride of at least one transition metal element, such as iron and/or copper (and more specifically, an iron and copper fluoride) or an oxide of at least one transition metal element, such as nickel, examples falling within this category being $FeF_2$, $FeF_3$, $Cu_xFe_{(1-x)}F_2$ with $0 < x \leq 1$, NiO.

The active material may consist only of a conversion material or may further comprise a fluoride of an alkali element, such as LiF, a material meeting this specificity being the material LiF—NiO.

The positive electrode may consist only of the active material, namely, the conversion material, or may further comprise:
- a polymer binder, such as polyvinylidene fluoride (known by the abbreviation PVDF), a mixture of carboxymethylcellulose (known by the abbreviation CMC) with a latex of the styrene-butadiene (known by the abbreviation SBR) type or with polyacrylic acid (known by the abbreviation PAA); and/or
- one or more electrically conductive adjuvants, which may be carbon materials such as carbon black.

The positive electrode can be associated, according to the invention, with a current collector, for example, made of aluminium, which means, in other words, that it is in direct contact with this collector, to allow the flow of electric current to the outside the electrochemical cell. The current collector can be in the shape of an aluminium strip. The positive electrode, on the other hand, can be in the shape of a coated layer on the current collector.

During the charging step, while the negative electrode undergoes a phenomenon of volume expansion, the positive electrode undergoes a phenomenon of volume retraction related to the reformation of the conversion material. Conversely, during the discharge step, while the negative electrode undergoes a phenomenon of volume retraction related to the de-alloy reaction, the positive electrode undergoes a phenomenon of volume expansion related to the reaction of reduction of the conversion material. By way of example, the volume variations for the passage from one mole of $FeF_2$ to one mole of Fe and two moles of LiF can be estimated at more than 16.5% on the basis of the densities of the compounds (4.09 $g \cdot cm^{-3}$ for $FeF_2$, 7.874 $g \cdot cm^{-3}$ for Fe and 2.64 $g \cdot cm^{-3}$ for LiF). Whether in charge and discharge operation, the volume modification phenomena of the negative electrode are compensated for by those of the positive electrode, which allows to maintain a substantially constant overall volume of the cell.

The electrolyte disposed between the positive electrode and the negative electrode can be a liquid electrolyte comprising (or even consisting of) one or more organic solvents and at least one salt of M.

The liquid electrolyte can be confined in the separator disposed between the positive electrode and the negative electrode, which further allows physical separation therebetween.

This separator is advantageously made of a porous material capable of accommodating the liquid electrolyte in its porosity.

This separator can consist of a membrane made of a material selected from glass fibres (and more specifically, a nonwoven of glass fibres), a polymeric material, such as a polyterephthalate (such as a polyethylene terephthalate, known under the abbreviation PET), a polyolefin (for example, a polyethylene, a polypropylene), a polyvinyl alcohol, a polyamide, a polytetrafluoroethylene (known by the abbreviation PTFE), a polyvinyl chloride (known by the abbreviation PVC), a polyvinylidene fluoride (known by the abbreviation PVDF). The separator can have a thickness ranging from 5 to 300 µm.

The organic solvent(s) can be carbonate solvents and, more specifically:
- cyclic carbonate solvents, such as ethylene carbonate (symbolised by the abbreviation EC), propylene carbonate (symbolised by the abbreviation PC), butylene carbonate, vinylene carbonate, fluoroethylene carbonate, fluoropropylene carbonate and mixtures thereof;
- linear carbonate solvents, such as diethyl carbonate (symbolised by the abbreviation DEC), dimethyl carbonate (symbolised by the abbreviation DMC), ethylmethyl carbonate (symbolised by the abbreviation EMC) and mixtures thereof.

The organic solvent(s) can also be ester solvents (such as ethyl propionate, n-propyl propionate), nitrile solvents (such as acetonitrile) or ether solvents (such as dimethyl ether, 1,2-dimethoxyethane).

The salt(s) of M can be selected from the salts of the following formulas: MI, $M(PF_6)_n$, $M(BF_4)n$, $M(ClO_4)_n$, $M(bis(oxalato)borate)_n$ (which may be designated by the abbreviation $M(BOB)_n$), $MCF_3SO_3$, $M[N(FSO_2)_2]_n$, $M[N(CF_3SO_2)_2]_n$, $M[N(C_2F_5SO_2)_2]_n$, $M[N(CF_3SO_2)(R_FSO_2)]_n$, wherein $R_F$ is a group $-C_2F_5$, $-C_4F_9$ or $-CF_3OCF_2CF_3$, $M(AsF_6)_n$, $M[C(CF_3SO_2)_3]_n$, $M_2S_n$, $M(C_6F_3N_4)$ ($C_6F_3N_4$ corresponding to 4,5-dicyano-2-(trifluoromethyl)imidazole), M possibly being in particular an alkali element or an alkaline earth element and, more specifically still, M is Li (in particular, when the accumulator is a lithium accumulator), Na (in particular, when the accumulator is a sodium accumulator), K (in particular, when the accumulator is a potassium accumulator), Mg (in particular, when the accumulator is a magnesium accumulator), Ca (in particular, when the accumulator is a calcium accumulator) and n corresponds to the degree of valence of the element M (typically, 1, 2 or 3).

Furthermore, the liquid electrolyte can comprise at least one additive belonging to the category of carbonate compounds (being understood that this additive is different from the carbonate solvent(s) comprised, where appropriate, in the electrolyte), such as vinylidene carbonate or fluoroethylene carbonate, each additive can be comprised in the electrolyte at a content not exceeding 10% by mass of the total mass of the electrolyte.

More specifically, the electrolyte includes one or more additives selected from vinylidene carbonate, fluoroethylene carbonate and mixtures thereof.

In particular, a specific electrochemical cell in accordance with the invention is a cell comprising:
- a negative electrode comprising, as active material, a graphite-silicon composite;
- a positive electrode comprising, as active material, an iron and copper fluoride, such as $Cu_{0.5}Fe_{0.5}F_2$;
- an electrolyte comprising a mixture of carbonate solvents (for example, a mixture of ethylene carbonate and diethyl carbonate in equal proportions), a lithium salt and, as additives, vinylidene carbonate and trifluoroethylene carbonate.

Finally, the invention relates to a lithium accumulator comprising one or more electrochemical cells as defined above.

The accumulators of the invention can, furthermore, be adapted to various types of formats, such as the format of the button battery type, the cylindrical formats, in particular, the formats AAA, AA, C, D and DD; wound or spiral formats; the prismatic format.

The accumulators of the invention allow, in particular, to obtain high energy densities, due to the use of an alloyable material to enter into the constitution of the active material of the negative electrode.

The cell(s) in accordance with the invention can be prepared by a method comprising a step of assembling the positive electrode, the negative electrode and the electrolyte disposed between the negative electrode and the positive electrode.

To be directly in the operating state (that is to say in the charged state), the negative electrode can be introduced directly in a form, where the active material is in an alloyed form with the element M (for example, lithium, when the cell of the accumulator is a cell for a lithium accumulator), which may involve the implementation of a step of introducing the element M into the active material of the negative electrode (this will be prelithiation if M corresponds to lithium) before the introduction of the negative electrode into the cell.

Other features and advantages of the invention will become apparent from the additional description which follows and which relates to particular embodiments.

Of course, this additional description is given only by way of illustration of the invention and in no way constitutes a limitation.

BRIEF DESCRIPTION OF THE DRAWINGS

FIG. 1 is a graph illustrating the evolution of the discharge capacity C (in mAh/g) as a function of the number of cycles N for batteries exemplified in Example 1 below.

DETAILED DESCRIPTION OF PARTICULAR EMBODIMENTS

Example 1

This example illustrates the preparation of a cell according to the invention in the form of a button battery comprising:
- as negative electrode, a negative electrode comprising, as active material, a silicon-graphite composite; and
- as a positive electrode, an electrode comprising, as active material, an iron and copper fluoride corresponding to the formula $Cu_{0.5}Fe_{0.5}F_2$; and
- an electrolyte placed between said positive electrode and the negative electrode, the composition of which will be explained below.

First, the active material of the positive electrode with the formula $Cu_{0.5}Fe_{0.5}F_2$ is prepared by ball milling. For this purpose, an equivalent number of moles of the two precursors $CuF_2$ and $FeF_2$ (obtained from the supplier Aldrich) were placed in a 50 mL stainless steel grinding bowl containing 15 balls of different diameters. The grinding bowl, filled under argon in a glove box, is closed by a flange and placed on a RETCH PM100 planetary mill. After a grinding time of 12 hours at 300 revolutions/min, the grinding bowl is unloaded in a glove box under argon and the material in powder form is characterised by X-ray diffraction under kapton, in order to preserve its structure.

The powder thus obtained is thoroughly mixed up in an amount of 80%, in a glove box and under argon, with 10% Super P carbon, 10% polyvinylidene fluoride (PVDF) in N-methyl-2-pyrrolidone (NMP), the resulting mixture being coated on an aluminium strip with a doctor blade set to a wet thickness of 100 μm. After drying under vacuum at 80° C., the electrode is then obtained by cutting a disc with a diameter of 14 mm followed by compression, still under argon.

Secondly, the negative electrode is prepared, in a dry room, by mixing the active material, which is a silicon-graphite (60/40) composite, with carboxymethylcellulose (CMC), a styrene-butadiene (SBR) latex and carbon fibres VGCF, said active material being present in an amount of 88% by mass of the mixture, carboxymethylcellulose being present in an amount of 2% by mass of the mixture, the latex being present in an amount of 4% by mass of the mixture and the fibres being present in an amount of 6% by mass of the mixture. The mixture is then deposited on a copper strip. The electrode is then obtained by cutting a disc with a diameter of 16 mm.

The negative electrode thus obtained is subjected to a prelithiation (in other words, so that it is in the charged state) by mounting it in a button battery facing a metallic lithium electrode, the two electrodes being separated by a Celgard 2500 type separator impregnated with an electrolyte comprising a mixture of carbonate solvents (ethylene carbonate/diethyl carbonate) (1:1 by volume), vinylidene carbonate in an amount of 2% by mass relative to the total mass of the electrolyte, trifluoroethylene carbonate in an amount of 10% by mass relative to the total mass of the electrolyte and a lithium salt $LiPF_6$ (1M).

After prelithiation, the button battery is removed in a glove box then the negative electrode is recovered and rinsed with dimethyl carbonate and then dried under argon. The negative electrode is then mounted in a button battery facing the positive electrode comprising, as active material, $Cu_{0.5}Fe_{0.5}F_2$, this positive electrode having an equivalent capacity, so as to balance the button battery. In this battery, the two electrodes are separated by a Celgard 2500 type separator impregnated with an electrolyte comprising a mixture of carbonate solvents (ethylene carbonate/diethyl carbonate) (1:1 by volume), vinylidene carbonate in an amount of 2% by mass relative to the total mass of the electrolyte, trifluoroethylene carbonate in an amount of 10% by mass relative to the total mass of the electrolyte and a lithium salt $LiPF_6$ (1M).

In parallel, a similar button battery is produced except that the negative electrode including, as active material, a silicon-graphite composite, is replaced by a negative electrode made of metallic lithium.

The two button batteries are subjected to electrical tests at C/50 between 4.25 V and 1 V and the evolution of the discharge capacity C (in mAh/g) is determined as a function of the number of cycles N, the results being reported on the single FIGURE (called [FIG. 1]) attached in the annex (curve a) for the battery in accordance with the invention and curve b) for the battery not in accordance with the invention).

It appears that the button battery in accordance with the invention has a higher discharge capacity than the button battery not in accordance with the invention, for example, a discharge capacity of about 240 mAh/g for the second cycle for the button battery in accordance with the invention against 150 mAh/g for the button battery not in accordance with the invention.

The invention claimed is:

1. An electrochemical cell comprising:
   a negative electrode comprising an active material comprising a material alloyable with an element M, wherein M comprises an alkali element or an alkaline earth element;
   a positive electrode comprising an active material comprising a conversion material; and
   an electrolyte solution comprising at least one salt of M disposed between the negative electrode and the positive electrode; and wherein
   during a charging process, the active material of the negative electrode forms an alloy with M of the salt of M of the electrolyte solution, the electrolyte solution comprising a liquid solvent comprising one or more organic solvents, at least one salt of M, and one or more additives selected from the group consisting of vinylidene carbonate, fluoroethylene carbonate and mixtures thereof, each additive being comprised in the electrolyte solution at a content not exceeding 10% by mass of the total mass of the electrolyte solution.

2. The electrochemical cell according to claim 1, wherein the element M is an alkaline element, and wherein M and the material alloyable with M are selected from:
   lithium, wherein the material alloyable with M is selected from the group consisting of lead with oxidation degree 0, tin with oxidation degree 0, silicon with oxidation degree 0, germanium with oxidation degree 0, antimony with oxidation degree 0, phosphorus with oxidation degree 0 and combinations thereof;
   sodium, wherein the material alloyable with M is selected from the group consisting of lead with oxidation degree 0, tin with oxidation degree 0, silicon with oxidation degree 0, germanium with oxidation degree 0, antimony with oxidation degree 0, phosphorus with oxidation degree 0 and combinations thereof;
   potassium, wherein the material alloyable with M is selected from the group consisting of lead with oxidation degree 0, tin with oxidation degree 0, silicon with oxidation degree 0, germanium with oxidation degree 0, antimony with oxidation degree 0, phosphorus with oxidation degree 0 and combinations thereof.

3. The electrochemical cell according to claim 2, wherein the element M is lithium and the material alloyable with M comprises silicon with oxidation degree 0.

4. The electrochemical cell according to claim 1, wherein the active material of the negative electrode further comprises graphite capable of intercalating the element M during the charging process.

5. The electrochemical cell according to claim 1, wherein the negative electrode further comprises:
   a polymer binder; and/or
   one or more electrically conductive adjuvants.

6. The electrochemical cell according to claim 1, wherein the conversion material of the positive electrode active material is selected from the group consisting of a fluoride of at least one transition metal element, a phosphide of at least one transition metal element, a sulphide of at least one transition metal element, an oxide of at least one transition metal element and mixtures thereof.

7. The electrochemical cell according to claim 6, wherein the conversion material of the positive electrode active material comprises a fluoride of at least one transition metal element.

8. The electrochemical cell according to claim 1, wherein the conversion material of the positive electrode active material comprises an iron copper fluoride.

9. The electrochemical cell according to claim 1, wherein the positive electrode further comprises:
   a polymer binder; and/or
   one or more electrically conductive adjuvants.

10. The electrochemical cell according to claim 1, wherein the organic solvent(s) are carbonate solvents.

11. The electrochemical cell according to claim 1, wherein the salt(s) of M are selected from the salts of the following formulas: MI, $M(PF_6)_n$, $M(BF_4)_n$, $M(ClO_4)_n$, $M(bis(oxalato)borate)_n$, $MCF_3SO_3$, $M[N(FSO_2)_2]_n$, $M[N(CF_3SO_2)_2]_n$, $M[N(C_2F_5SO_2)_2]_n$, and $M[N(CF_3SO_2)(R_FSO_2)]_n$, wherein $R_F$ is a group —$C_2F_5$, —$C_4F_9$ or —$CF_3OCF_2CF_3$, $M(AsF_6)_n$, $M[C(CF_3SO_2)_3]_n$, $M_2S_n$, $M(C_6F_3N_4)$, $C_6F_3N_4$ corresponding to 4,5-dicyano-2-(trifluoromethyl) imidazole, M being an alkali element or an alkaline earth element and n corresponds to the degree of valence of the element M.

12. The electrochemical cell according to claim 1, wherein:
   the active material of the negative electrode comprises a graphite-silicon composite;
   the active material of the positive electrode comprises an iron and copper fluoride; and
   the electrolyte solution comprising a mixture of carbonate solvents, a lithium salt and additives comprising vinylidene carbonate and fluoroethylene carbonate.

13. A lithium battery comprising one or more electrochemical cells as defined in claim 1.

* * * * *